(12) United States Patent
Dorrity (10) Patent No.: US 9,357,762 B2
(45) Date of Patent: Jun. 7, 2016

(54) HUNTER'S TREE STAND ASSEMBLY

(71) Applicant: Richard J Dorrity, New Orleans, LA (US)

(72) Inventor: Richard J Dorrity, New Orleans, LA (US)

(*) Notice: Subject to any disclaimer, the term of this patent is extended or adjusted under 35 U.S.C. 154(b) by 0 days.

(21) Appl. No.: 14/468,932

(22) Filed: Aug. 26, 2014

(65) Prior Publication Data

US 2016/0057990 A1    Mar. 3, 2016

(51) Int. Cl.
*A01M 31/02* (2006.01)

(52) U.S. Cl.
CPC .................................... *A01M 31/02* (2013.01)

(58) Field of Classification Search
CPC ........................................................ A01M 31/02
See application file for complete search history.

(56) References Cited

U.S. PATENT DOCUMENTS

| | | | |
|---|---|---|---|
| 4,337,844 A | 7/1982 | Hice, Sr. | |
| 4,723,630 A | 2/1988 | Wolford et al. | |
| 4,834,217 A * | 5/1989 | Manes | A45F 3/26 108/152 |
| 5,143,176 A * | 9/1992 | Burdette | A01M 31/02 182/133 |
| 5,316,104 A * | 5/1994 | Amacker | A01M 31/02 182/133 |
| 5,685,395 A | 11/1997 | Nelson | |
| 5,887,676 A * | 3/1999 | Harbin | A01M 31/02 182/127 |
| 5,954,158 A | 9/1999 | Concepcion | |
| 6,308,801 B1 * | 10/2001 | Futch | A01M 31/02 182/136 |
| 6,988,588 B2 * | 1/2006 | Prejean | A01M 31/02 182/136 |
| 7,306,074 B2 | 12/2007 | Voorhies | |
| 7,370,728 B1 | 5/2008 | Mann | |
| 7,748,497 B2 * | 7/2010 | Tolliver | A01M 31/02 182/135 |
| 7,849,964 B2 * | 12/2010 | Amacker | A01M 31/006 182/136 |
| 8,381,876 B1 * | 2/2013 | Darden | A63B 27/02 182/136 |
| 2002/0139615 A1 * | 10/2002 | Penz | A01M 31/02 182/136 |
| 2006/0169538 A1 | 8/2006 | Louk et al. | |

* cited by examiner

*Primary Examiner* — Alvin Chin-Shue
(74) *Attorney, Agent, or Firm* — Keaty Law Firm (57) ABSTRACT

The invention relates to a tree stand assembly for engaging a tree and supporting a person above ground. The tree stand assembly has a tree stand member and a tree climber member configured for frictional engagement with a tree trunk. The tree stand member has a foot platform, a flexible seat and a tree engaging portion with teeth. The tree climber member is positioned below the tree stand member and is provided with a V-shaped tree engaging member. Detachable locking bars on the tree stand member and the tree climber member allow adjustment of the assembly to different diameter trees.

22 Claims, 6 Drawing Sheets

HUNTER'S TREE STAND ASSEMBLY

BACKGROUND OF THE INVENTION

This invention relates to a tree stand and, more particularly, to a tree stand that can be used for supporting hunters, wild life watchers, photographers and the like on a tree.

Tree stands are generally well known in the sport of hunting. The tree stands typically include a hunter support platform made of wood or plywood. The tree stand is secured to a tree at some distance above the ground, and a mechanism, such as a ladder, is used to allow the hunter to climb up to, and down from, the tree stand. A conventional tree stand can be either permanently or detachably positioned on the tree. The tree stand may include a seat, a rifle or bow support, or even a blind to conceal the hunter. Most of the tree stands require assistance of several persons to erect and take down.

In response to the need for a single-person operation, there has been proposed a number of portable stands, which usually combine a ladder with a small platform attached to the top of the ladder. The hunter leans the ladder against a large tree and climbs to the platform which can be 10-20 feet above the ground. Needless to say such tree stands are inherently unsafe.

Other solutions provide for the use of a platform, which is permanently attached to a tree, and a plurality of spaced-apart brackets attached to the tree. The brackets serve as steps for the hunter to climb in order to reach the platform.

Still other solutions provide for the use of a tree stand and a tree climber attachment, which the hunter moves with his feet while advancing up the tree. These stands, while advantageous in many respects, are often made of separate foldable and telescoping parts. As these tree stands are put in use, the noise of the unfolding telescoping parts scares the wildlife.

The present invention contemplates elimination of drawbacks associated with conventional tree stands and provision of an easy-to-manufacture and easy-to-use tree stand that a single hunter can position on a tree by using a moveable tree-climber unit.

SUMMARY OF THE INVENTION

It is, therefore, an object of the present invention to provide a tree stand that can support a person above the ground on a tree.

It is another object of the invention to provide a tree stand assembly that is provided with a seating area and a tree climber unit movable separately from the tree stand by a single person.

These and other objects of the invention are achieved through a provision of a tree stand assembly, which comprises a tree stand member having a platform, a seat member and a tree engaging portion. The tree engaging portion has a pair of tree engaging arms provided with spaced teeth configured to frictionally engage the tree. The tree stand member comprises a frame formed by a pair of elongated parallel rails, a bottom cross bar, a first intermediate cross bar secured to the rails above the bottom rail, a second intermediate cross bar secured to the rails above the first intermediate cross bar, and a detachable locking bar configured for detachable engagement with upper ends of the rails a distance from the second intermediate cross bar. The locking bar has a pair of wedges configured to frictionally engage the tree and stabilize position of the tree stand member.

The assembly has a tree climber member detachably coupled to the tree stand member and configured to engage the tree below the tree stand member. The hunter uses the tree climber member as a standing platform gradually moving the tree climber member up the tree and pulling the tree stand to the desired height above ground.

BRIEF DESCRIPTION OF THE DRAWINGS

Reference will now be made to the drawings, wherein like parts are designated by like numerals, and wherein.

DETAIL DESCRIPTION OF THE INVENTION

Turning now to the drawings in more detail, numeral 10 designates the hunter's tree stand assembly according to the present invention. The assembly 10 comprises a tree stand member 12 and a tree climber member 14. The tree stand member 12 comprises an open frame 16 formed by a pair of elongated parallel rails 18, 20 retained in the spaced-apart relationship by a plurality of cross bars. A bottom cross bar 22 connects lower portions of the rails 18, 20; a first intermediate cross bar 24 is secured to the rails 18, 20 a distance above the bottom cross bar 22; and a second intermediate cross bar 26 is secured a distance above the first intermediate cross bar 24. The cross bars 22, 24, and 26 are affixed to the opposing rails 18, 20 by bolts, nails, or other mechanical means perpendicularly to the rails.

A detachable locking bar 30 is removably secured to the upper portions of the rails 18, 20. In one aspect of the invention, the locking bar 30 overlaps the rails 18, 20. The locking bar 30 comprises an elongate beam provided with an aperture 32 at one of its ends 33 and an aperture 34—at its opposite end 35. The locking bar 30 can be configured as a parallelepiped with square or rectangular cross-section. A pair of spaced wedges 37, 38 is secured on a contact surface 39 of the locking bar 30, the surface which faces the tree when the tree stand member 12 is in use. The wedges 37, 38 have a substantially triangular configuration, with apexes of the triangular wedges facing the tree. The wedges 37, 38 are designed to prevent shifting of the tree stand member 12 during use, as will be explained in more detail hereinafter.

A plurality of axially openings 40 is formed in the upper portion 42 of the rail 18. A corresponding number of aligned openings 46 are formed in the upper portion 48 of the rail 20. The aperture 32 are configured to align with any one of the openings 40 in the rail 18, while the aperture 34 is configured to align with any of the openings 46 of the rail 20 when the locking bar 30 is engaged with the rails 18 and 20.

Figure 3:
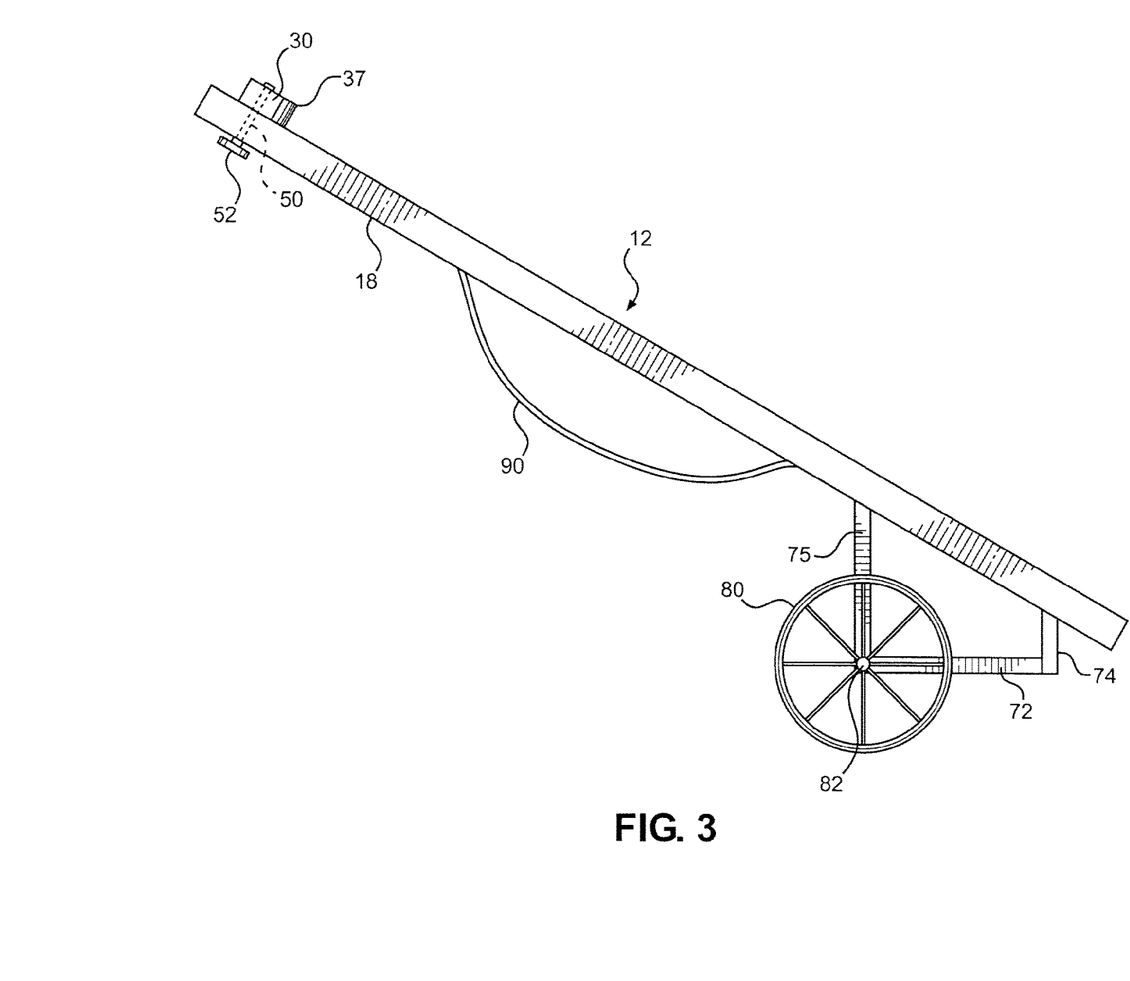
FIG. 3 is a side view of the tree stand member.

The assembly comprises a means for engaging the locking bar 30 with the rails 18 and 20. A locking bolt or locking pin 50 is configured to fit within the apertures 32, 34 and the openings 40, 46. The locking bolt or pin 50 carries a locking nut 52, which is engaged with one end of the locking bolt 50, on the underside of the rails 18, 20, as shown in FIG. 3. The locking nut 52 secures the bottom of the locking bolt 50 in the apertures 32, 34 and the openings 40, 46 while detachably affixing the locking bar 30 to the rails 18, 20. The locking bar 30 extends between and perpendicularly in relation to, the rails 18, 20.

The tree stand member 12 comprises a means for frictionally engaging a tree trunk, said means comprising a pair of tree engaging arms 60, 62 secured to the second intermediate bar 26. The tree-engaging arms 60, 62 are oriented at an acute angle to each other and form a V-shaped channel 65 for receiving a tree trunk 64 therein. Each of the tree engaging arms 60, 62 is secured to mid-section of the second cross bar 26 at one of its ends and to a respective rail 18 or 20—at its opposite end. A plurality of spaced teeth 61 is formed on a contact surface 63 of each of the tree engaging arms 60, 62.

When the tree stand member is engaged with the trunk of a tree 64 the locking bar 30 is moved into contact with the tree trunk 64, while the teeth 61 of the tree engaging arms 60, 62 and the wedges 37, 38 frictionally engage the tree trunk 64 stabilizing position of the tree stand member and preventing its lateral and vertical shifting during use. Depending on the diameter of the tree trunk 64, the locking bar 30 can be moved closer to the second intermediate cross bar 26 or farther away from it.

A lower portion of the tree stand member 12 carries a platform 70, which is suspended from the rails 18 and 20 in the area between the lower cross bar 22 and the first intermediate cross bar 24. The platform 70 comprises a planar plate 72, which is affixed to the rail 18 by attachment bars 74, 75, and to the rail 20—by attachment bars 76, 77. The attachment bars 74, 75, 76, and 77 extend at a right angle to the rails 18, 20. In the preferred embodiment, the front attachment bars 74, 76 are shorter than the rear attachment bars 75, 77 so as to retain the platform 72 generally parallel to the ground 100 when the tree stand member 12 is positioned on the tree trunk 64.

It is envisioned that the step member 72 can be made from a solid piece of wood, plywood, lightweight metal, etc. If desired, the step plate 72 can be formed from a segment of mesh material supported by a sturdy peripheral border 78. Alternatively, the platform 70 can be formed with non-smooth upper surface to reduce a chance of the hunter slipping on the platform.

Figure 1:
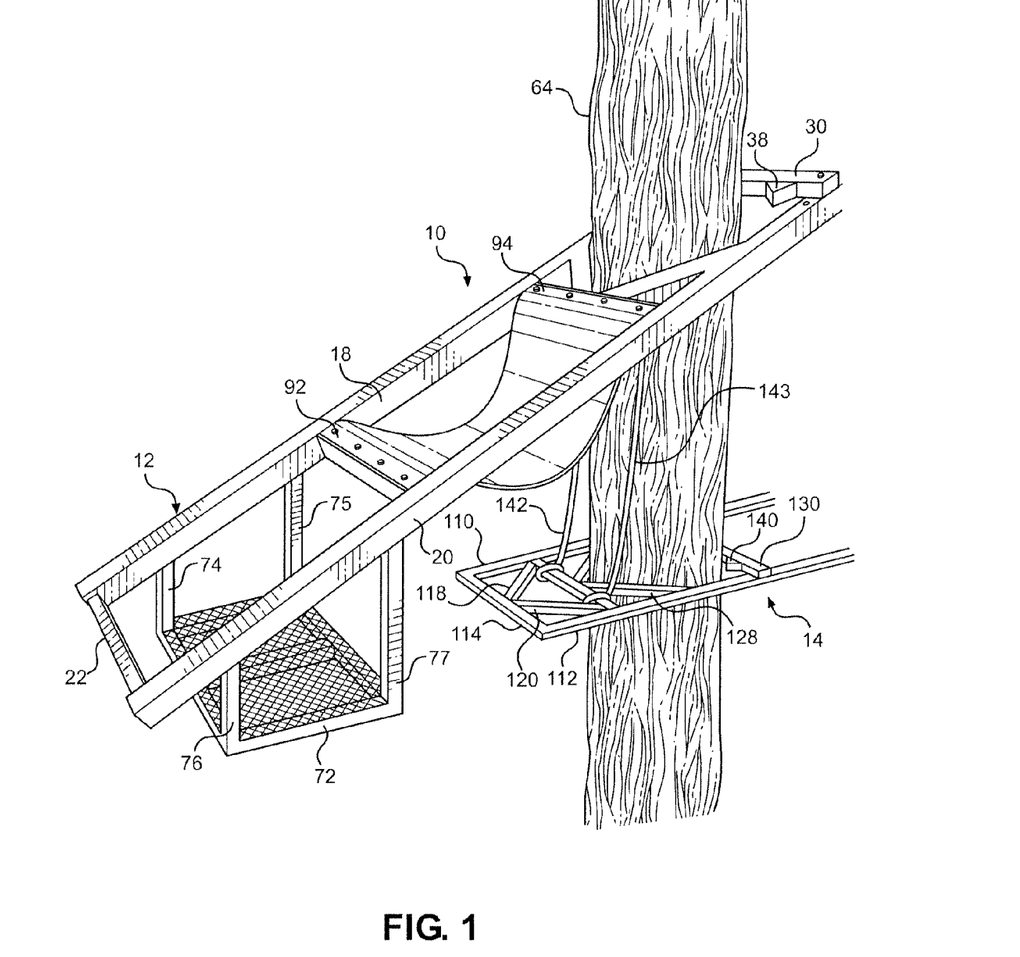
FIG. 1 is a perspective view of the tree stand assembly according to the present invention.
Figure 2:
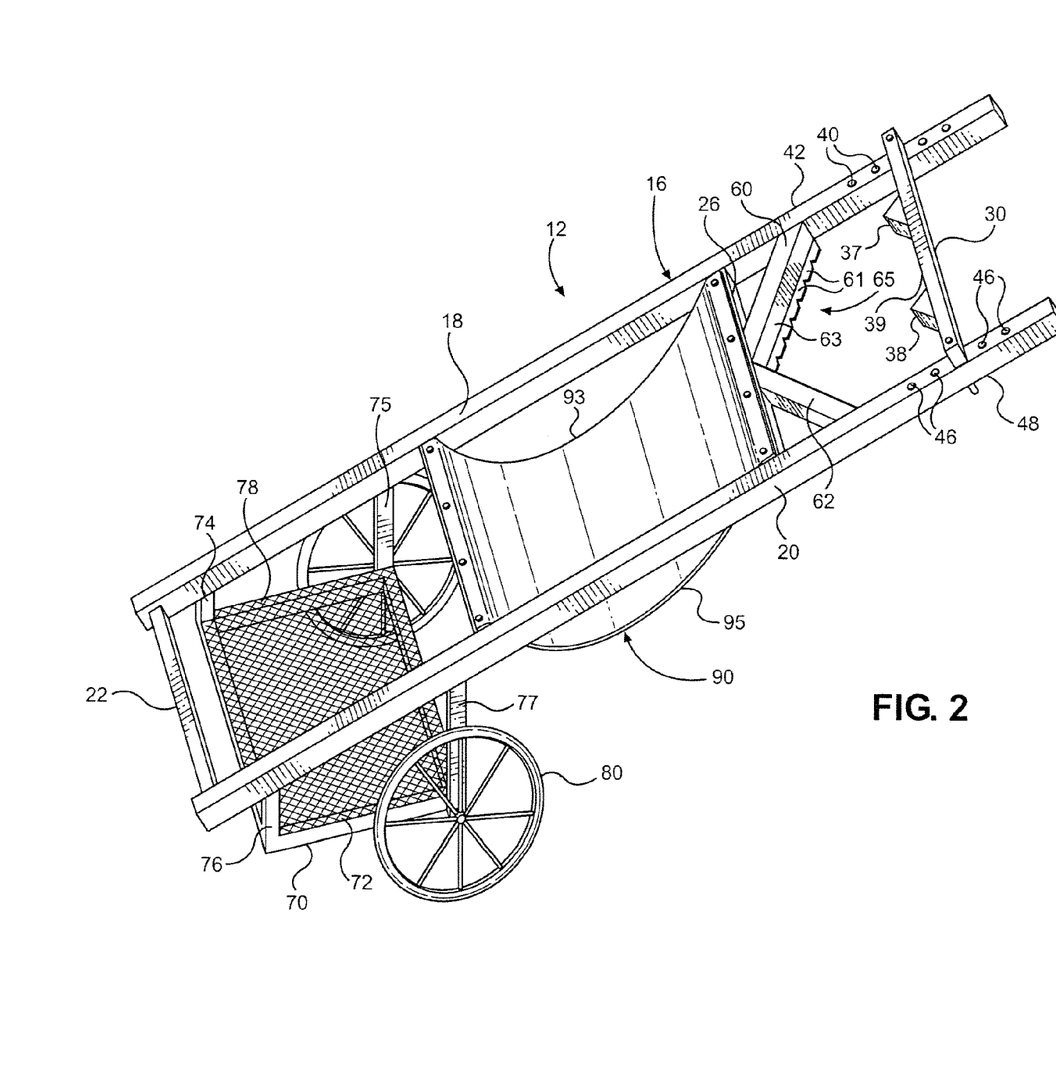
FIG. 2 is a perspective view of the tree stand member of the present invention.

The tree stand member 12 can be provided with an optional set of rotating wheels 80 (FIG. 2) connected to the lower ends of the rear attachment bars 75, 77. The wheels 80 an be connected by a common axle or individually rotated on pins 82, which engage with the openings (not shown) formed in the rear attachment bars 75, 77.

A seat member 90 is suspended between and is secured to, the first intermediate cross bar 24 and the second intermediate cross bar 26. The seat member 90 has a flexible foldable seat portion that can be formed from a piece of flexible foldable material, natural or synthetic, such as for instance mildew-resistant fabric. As can be seen in the drawings, the seat member has a substantially rectangular configuration and is secured along a lower edge 92 and an upper edge 94 to the intermediate cross bars 24, 26, respectively. The sides 93, 95 of the seat member 90 remain unsecured allowing a hunter to insert his legs in the space 96 between the rails and the sides 93, 95 of the seat member 90 when climbing up the tree 64 and descending therefrom.

Figures 4, 5:
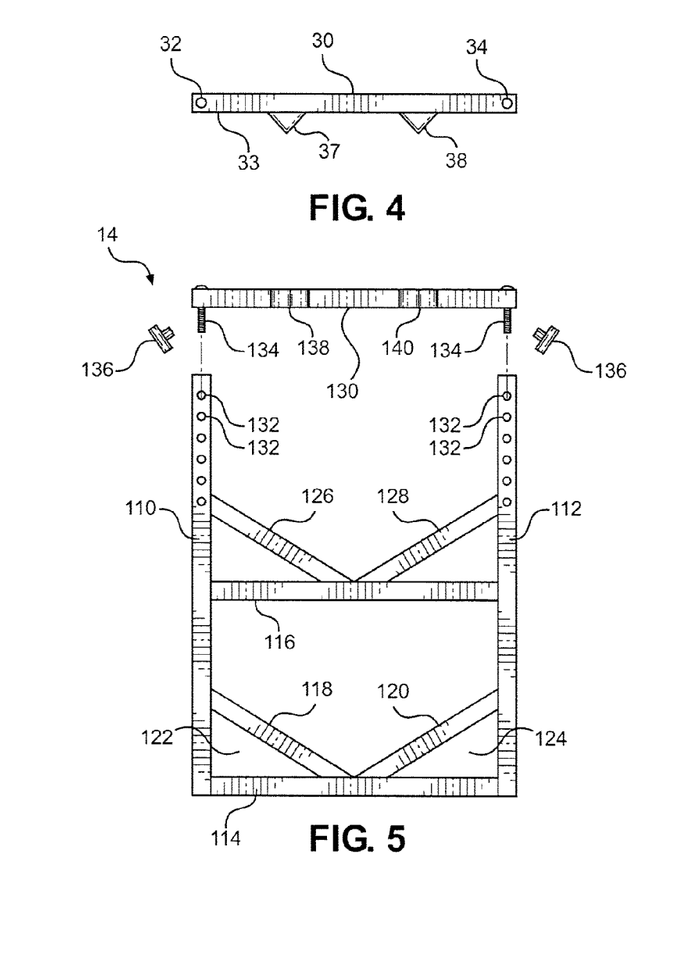
FIG. 4 is a detail side view of the locking bar.
FIG. 5 is an exploded view of the tree climber member of the assembly of the present invention.

FIG. 5 illustrates the tree climber member 14. As can be seen in the drawing, the tree climber member 14 comprises a pair of elongated parallel side bars 110, 112 and a pair of transverse bars 114, 116 extending at a right angle to the side bars 110, 112. A pair of angular braces 118, 120 is secured to the transverse bar 114 forming a V-shaped configuration.

A left foot engaging area 122 is formed by a portion of the side bar 110, a portion of the transverse bar 114 and the angular brace 118. A right foot engaging area 124 is formed between a portion of the side bar 112, a portion of the transverse bar 114 and the angular brace 120. When the hunter climbs up or down the tree 64, the hunter places his/her feet in the spaces 122, 124 and pushes against the angular braces 118, 120 to move the tree climber member 14 upwardly or downwardly.

A pair tree engaging angular braces 126, 128 is attached to the transverse bar 116. Similar to the V-shaped tree engaging arms 60, 62, the angular braces 126, 128 contact the tree 64 when the tree climber member 14 is in use.

The tree climber member 14 comprises a third transverse bar or climber locking bar 130 which is configured to detachably engage the side bars 110, 112 and contact the tree trunk 64 opposite the angular braces 126, 128. The side bars 110, 112 are provided with a plurality of spaced axially aligned openings 132, which allow the third transverse bar 130 to be moved along the length of the side bars 118, 120.

Similar to the locking bar 30, the third transverse bar 130 has a pair of apertures configured to receive a securing bolt 134 therethrough. When the third transverse bar 130 is engaged with side bars 110, 112 the securing bolts 134 pass through the openings 132 and are engaged on the underside by locking nuts 136. A pair of spaced apart wedges 138, 140, similar to the wedges 37, 38 stabilize position of the tree climber member 14 on the tree trunk 64.

A pair of flexible foldable collapsible straps 142, 143 is detachably secured to the second transverse brace 116 and to the second intermediate cross bar 26 to retain the tree climber member 14 with the tree stand member 12 when the assembly 10 in use. Should the tree climber member 14 slide downwardly along the trunk the straps 142, 143 prevent it from falling all the way to the ground and leaving the hunter stranded on the tree 64 without a means to climb down the tree.

Figure 6:
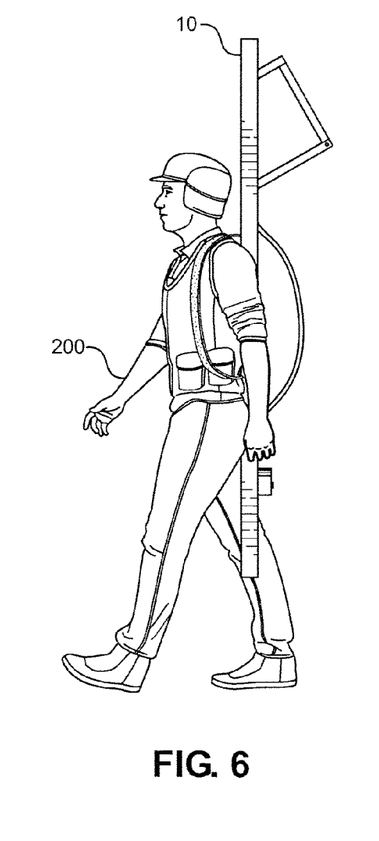
FIG. 6 illustrates a hunter carrying the tree stand assembly.
Figure 7:
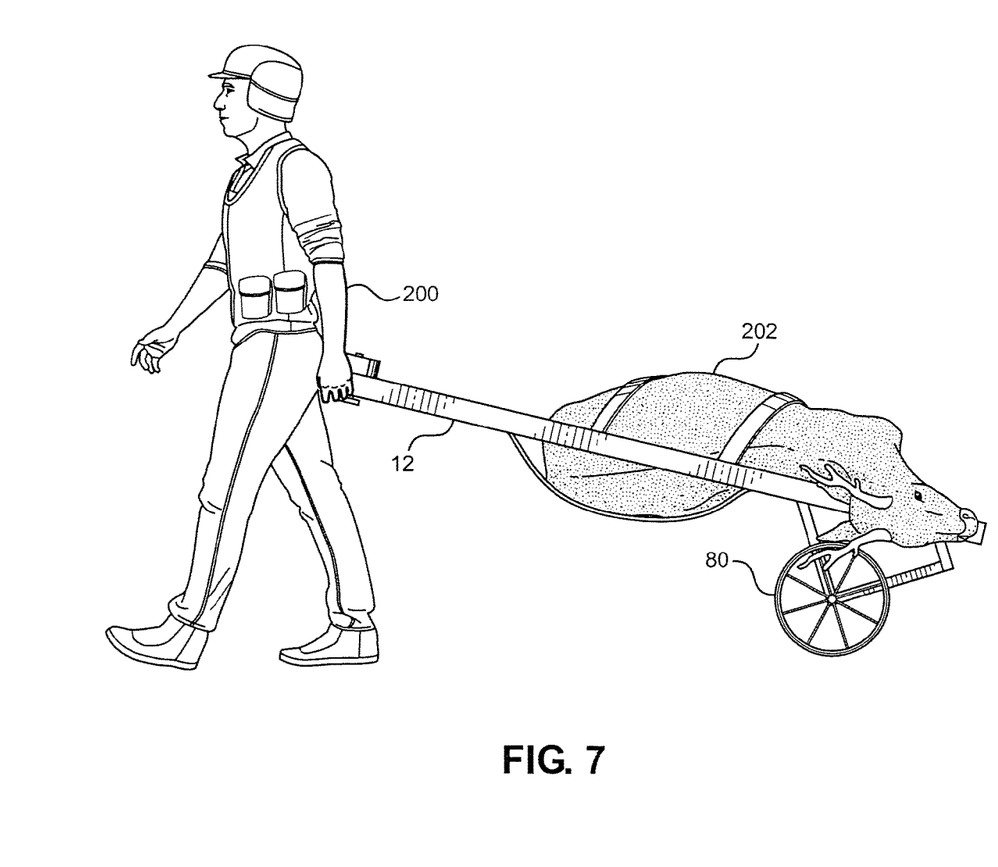
FIG. 7 illustrates the hunter pulling the tree stand assembly with the game positioned on the tree stand.

The tree stand assembly can be easily transported to the desired site by strapping the tree stand member on the back of a hunter 200, as illustrated in FIG. 6. The tree stand member 12 can also be used for transporting game 202 from the hunting site. The wheeled tree stand member 12 can be used as a cart or a dolly, with the hunter 200 pulling the tree stand member by the locking bar 30.

Figure 8:
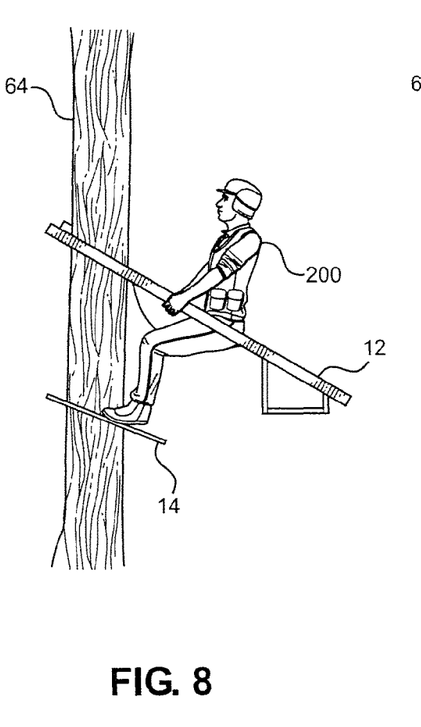
FIGS. 8 through 10 illustrate the manner of using the tree stand assembly when climbing a tree.
Figure 9:
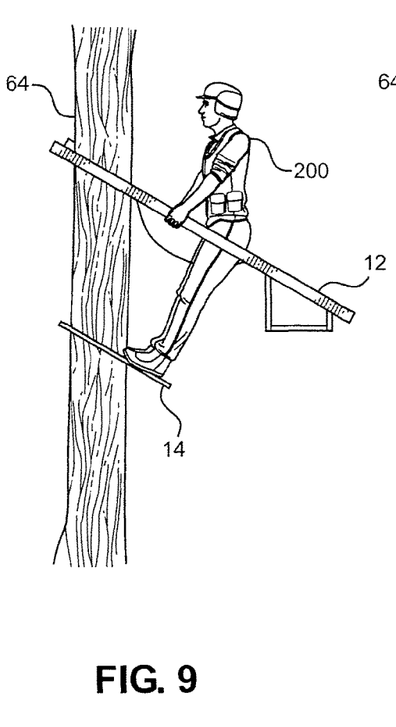
Figure 10:
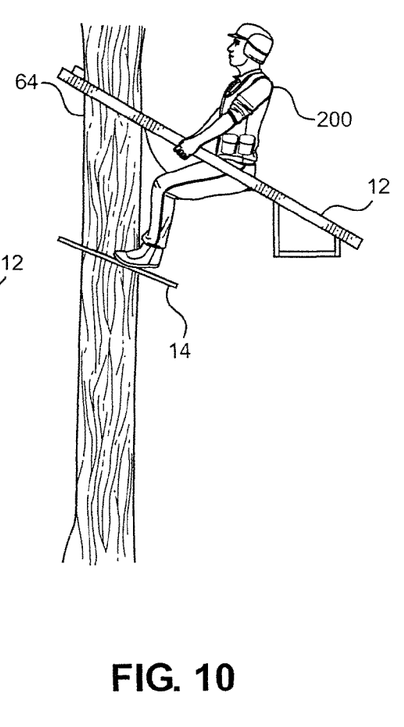

FIG. 8-10 schematically illustrate the use of the tree stand assembly 10 when climbing the tree 64. The hunter positions the tree stand member on the tree 64 and adjusts location of the locking bar 30 to ensure tight frictional engagement of the teeth 61 and the wedges 37, 38 with the tree 64. The hunter then positions the tree climber member 14 below the tree stand member 12 and attaches the tree climber member 14 to the tree stand member 12 using straps 142, 143.

The hunter then uses the platform 72 to climb onto the tree stand member 12 and seats in the seat member 90 facing the tree 64. In this position, the hunter 200 straddles the tree stand member 12 by inserting his legs between the side edges 93, 95 of the seat member 90 and the side rails 18, 20. The hunter then inserts toes of the hunting boots into the foot spaces 122, 124 moving the toes against the underside of the angular braces 118, 120.

Leaning against the tree stand member 12, the hunter moves the tree climber member 14 upwardly by pushing against the angular braces 118, 120. The hunter then moves his/her feet to stand on the tree climber member 14, while pulling the tree stand member 12 upwardly, as shown in FIG. 9. The hunter then lowers into the seat 90 and uses his/her feet to move the tree climber member 14 higher along the tree trunk, as shown in FIG. 10. The hunter repeats these steps until he/she reaches the desired height on the tree. The hunter then rotates his/her body and seats in the seat member 90 while resting his/her feet on the platform 72 or the bottom cross bar 22. In this position, the hunter's back is toward the tree 64. When descending from the tree 64, the hunter 200 reverses the process described above.

The tree stand member 12 and the tree climber member 14 can be made from lightweight noncorrosive metal, such as aluminum. In one exemplary embodiment, the tree stand assembly 10 weighs less than 30 lbs and is easy to carry. The assembly 10 is quiet in operation as there are no telescoping or hinging/folding parts, which would cause metal-on-metal noise in the forest. The platform 72 can be used as a foot rest, as a place to rest a gun, a bow, or a backpack. The tree stand assembly 10 can be easily and quickly disengaged from the tree by essentially reversing the procedure used for its installation. The tree stand assembly in accordance with the present invention is a much safer tree stand than any of its predecessors.

Many changes and modifications can be made in the design of the present invention without departing from the spirit thereof. I, therefore, pray that my rights to the present invention be limited only by the scope of the appended claims.

I claim:

1. An apparatus for engaging trees and for supporting a person above the ground, comprising:
a tree stand member comprising a frame formed by a pair of elongated unitary parallel rails, a bottom cross bar, a first intermediate cross bar secured to the rails above the bottom rail, a second intermediate cross bar secured to the rails above the first intermediate cross bar, and a detachable locking bar configured for detachable engagement with upper ends of the rails a distance from the second intermediate cross bar, the tree stand member having a platform suspended between the bottom cross bar and the first intermediate cross bar, the platform comprising a planar plate affixed to the rails by front attachment bars and rear attachment bars extending downwardly from and at an angle with respect to a longitudinal axis of the rails and retaining the platform generally parallel to the ground when the tree stand member is positioned on a tree trunk to support a user in a standing position, the tree stand member further comprising a seat member and a tree engaging portion, the tree engaging portion comprising a pair of tree engaging arms provided with spaced teeth configured to frictionally contact the tree; and
a tree climber member detachably coupled to the tree stand member and configured to engage the tree below the tree stand member, further comprising a foot engaging member positioned between the first transverse bar and the second transverse bar, the foot engaging member has a V-shaped configuration formed by a pair of angular braces secured to the first transverse bar and extending to the side bars, the angular braces being engageable by user's feet when climbing or descending the tree trunk.

2. The apparatus of claim 1, comprising a pair of wheels secured to a lower portion of the frame.

3. The apparatus of claim 1, the bottom cross bar, the first intermediate cross bar, the second intermediate cross, and the locking bar extending between and perpendicularly in relation to, the rails.

4. The apparatus of claim 1, the seat member comprises a flexible foldable seat portion.

5. The apparatus of claim 1, the locking bar is provided with a pair of spaced-apart wedge members configured to frictionally engage the tree when the tree stand is positioned on the tree.

6. The apparatus of claim 1, wherein each of said rails is provided with a plurality of spaced-apart axially aligned openings and the locking bar carries locking pins configured to selectively engage the openings in the rails and secure the locking bar at a desired distance from the tree engaging arms.

7. The apparatus of claim 1, wherein the tree engaging arms form a V-shaped tree engaging part located between the second intermediate member and the locking bar.

8. The apparatus of claim 1, the tree climber member comprises a pair of elongated parallel side bars, a first transverse bar secured to and extending at a right angle to the side bars, a second transverse bar secured to and extending at a right angle to the side bars a distance from the first transverse bar, and a detachable climber locking bar secured to and extending at a right angle to the side bars a distance from the second transverse bar, the climber locking bar carrying a pair of spaced-apart wedge members stabilizing position of the tree climber member on the tree trunk.

9. The apparatus of claim 8, comprising a tree engaging member positioned between the second transverse bar and the climber locking bar.

10. The apparatus of claim 9, wherein the tree engaging member has a V-shaped configuration.

11. The apparatus of claim 9, wherein each of said side bars is provided with a plurality of spaced-apart axially aligned openings and the climber locking bar carries locking pins configured to selectively engage the openings in the side bars and secure the climber locking bar at a desired distance from the tree engaging member.

12. The apparatus of claim 1, comprising flexible foldable straps detachably securing the tree climber member to the tree stand member.

13. An apparatus for engaging trees and for supporting a person above the ground, comprising:
a tree stand member having a foot platform, a seat member suspended above the foot platform and a tree engaging portion, the tree engaging portion comprising a pair of tree engaging arms provided with spaced teeth configured to frictionally contact the tree; the tree stand member comprising a frame formed by a pair of elongated parallel rails, a bottom cross bar, a first intermediate cross bar secured at a right angle to the rails above the bottom rail, a second intermediate cross bar secured at a right angle to the rails above the first intermediate cross bar, and a detachable locking bar configured for detachable engagement with upper ends of the rails a distance from the second intermediate cross bar, the platform is suspended between the bottom cross bar and the first intermediate cross bar, the platform comprising a planar plate affixed to the rails by front attachment bars and rear attachment bars extending downwardly from and at an angle with respect to a longitudinal axis of the rails and retaining the platform generally parallel to the ground when the tree stand member is positioned on the tree trunk to support a user in a standing position on the platform and
a tree climber member detachably coupled to the tree stand member and configured to engage the tree below the tree stand member, the tree climber member comprising a pair of elongated unitary parallel side bars, a first transverse bar secured to and extending at a right angle to the side bars, a second transverse bar secured to and extending at a right angle to the side bars a distance from the first transverse bar, and a detachable climber locking bar secured to and extending at a right angle to the side bars a distance from the second transverse bar, the climber locking bar carrying a pair of spaced-apart wedges stabilizing the tree climber member on a tree trunk, comprising a V-shaped foot engaging member positioned between the first transverse bar and the second transverse bar formed by a pair of angular braces secured to the first transverse bar and extending to the side bars, the angular braces engageable by user's feet when climbing or descending the tree trunk.

14. The apparatus of claim 13, comprising a pair of wheels secured to a lower portion of the frame.

15. The apparatus of claim 13, the locking bar extending between and perpendicularly in relation to, the rails when engaged with the rails.

16. The apparatus of claim 13, the seat member comprises a flexible foldable seat portion.

17. The apparatus of claim 13, the locking bar is provided with a pair of spaced-apart wedge members configured to frictionally engage the tree when the tree stand is positioned on the tree.

18. The apparatus of claim 13, wherein each of said rails is provided with a plurality of spaced-apart axially aligned openings and the locking bar carries locking pins configured to selectively engage the openings in the rails and secure the locking bar at a desired distance from the tree engaging arms.

19. The apparatus of claim 13, wherein the tree engaging arms form a V-shaped tree engaging part located between the second intermediate member and the locking bar.

20. The apparatus of claim 13, comprising a V-shaped tree engaging member positioned between the second transverse bar and the climber locking bar.

21. The apparatus of claim 20, wherein each of said side bars is provided with a plurality of spaced-apart axially aligned openings and the climber locking bar carries locking pins configured to selectively engage the openings in the climber side bars and secure the climber locking bar at a desired distance from the tree engaging member.

22. The apparatus of claim 13, comprising flexible foldable straps detachably securing the tree climber member to the tree stand member.

* * * * *